United States Patent [19]

Ljung

[11] Patent Number: 4,884,446

[45] Date of Patent: Dec. 5, 1989

[54] SOLID STATE VIBRATING GYRO

[76] Inventor: Per B. Ljung, 32 Hemlock Ter., Wayne, N.J. 07470

[21] Appl. No.: 259,483

[22] Filed: Oct. 17, 1988

Related U.S. Application Data

[63] Continuation-in-part of Ser. No. 24,977, Mar. 12, 1987, abandoned.

[51] Int. Cl.[4] .............................................. G01P 9/04
[52] U.S. Cl. .................................................... 73/505
[58] Field of Search ......................................... 73/505

[56] References Cited

U.S. PATENT DOCUMENTS

| | | | |
|---|---|---|---|
| 3,924,474 | 12/1975 | Friedland et al. | 73/505 |
| 4,019,391 | 4/1977 | Ljung | 73/505 |
| 4,654,663 | 3/1987 | Alsenz et al. | 73/505 |
| 4,674,331 | 6/1987 | Watson | 73/505 |

OTHER PUBLICATIONS

T. Ueda, "Quartz Crystal Micromechanical Devices," *IEEE Transducers* 1985 Technical Digest, pp. 113–116.
J. Angell et al., "Silicon Micromechanical Devices," *Scientific American*, Apr. 1983, pp. 44–55.

*Primary Examiner*—John Chapman
*Attorney, Agent, or Firm*—Pollock, VandeSande & Priddy

[57] ABSTRACT

An angular rate sensor is formed of a transducer and associated electronics. The transducer consists of two parallel beams with attached proof masses, which are angularly vibrated about respective proof masses center of gravity in a first plane. Rotation of the gyro about its input axis results in Coriolis moments causing vibration in a plane normal to the first plane. A torque is applied to restrain the vibration of the proof masses to the first plane. A voltage proportional to this torque is demodulated and filtered and output as a voltage proportional to the angular input rate.

17 Claims, 5 Drawing Sheets

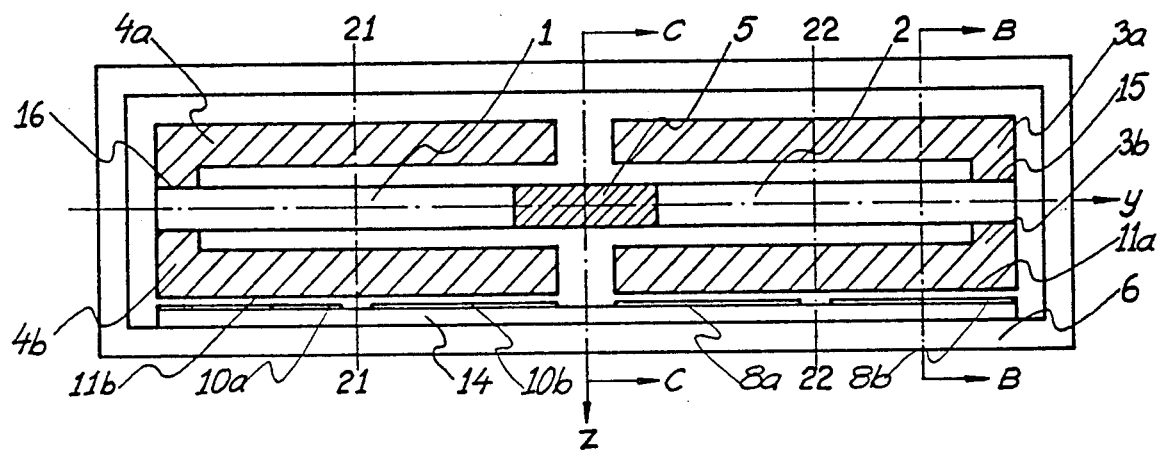
FIG 4
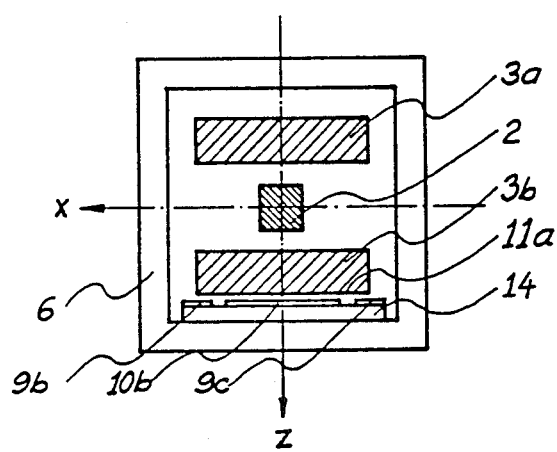
FIG 5a  Section B-B
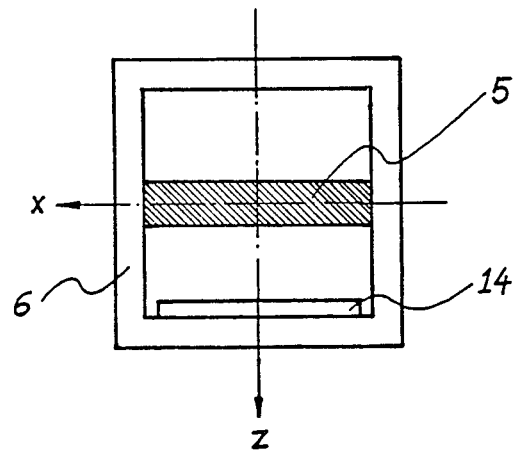
FIG 5b  Section C-C

SOLID STATE VIBRATING GYRO

This application is a continuation-in-part, of Ser. No. 024,977, filed on Mar. 12, 1987, now abandoned.

BACKGROUND ART

The present invention relates to an angular reference apparatus and particularly to a new and improved vibrating gyroscope.

As strapdown inertial navigation technology continues to progress, there is a need to develop low-cost angular rate sensors. These applications include the need for low cost, small size, lifetime calibration, no thermal control, high reliability, high bandwidth and rapid reaction.

Prior art U.S. Pat. Nos. 3,913,405 and 4,019,391 describe free gyroscopic sensors. One of the problems with these prior art instruments is their sensitivity for a combination of nonlinear spring rate, damping and tuning errors along different axes. This necessitates ellipticity control to dynamically tune the instrument as described in U.S. Pat. No. 4,079,630. However, a bias error remains, dependent on the direction of vibration in a complex way. The bias error is not stable and requires constant rotation (carrouselling) or elaborate computer modeling to cancel.

Prior U.S. Pat. No. 3,924,474 uses a viscous gas fill to provide damping in order make the instrument respond to the input angular rate. The viscous gas fill, however, reduces the Q-value of the instrument to a point where a large drive torque requirement causes significant errors.

FIG. 1 shows prior art U.S. Pat. No. 3,913,405 which uses orthogonally located forcers 7a, 7b (not shown 9a, 9b) and pickoffs 8a, 8b (not shown 10a, 10b) that excite and sensor angular vibrations of the proof masses about their GG:s. The proof masses 13a and 13b are connected by a rod 1. The nodal points of the vibrating proof masses are coincident with the proof masses' centers of gravity along axes 21—21 and 22—22. The rod features necked down sections 40 and 41 which are coincident with the nodal points, forming a nodal suspension system. The flow flexural stiffness of the necked down sections is required to produce a high Q-value. The low torsional stiffness about the input axis (Y-axis) of the necked down portion, however, results in a very low mechanical resonant frequency. FIG. 2 shows the rotational symmetry of the instrument and its orthogonally located forcers through section A—A in FIG. 1.

FIG. 3 shows prior art U.S. Pat. No. 4,019,391 which uses a rod with low flexural stiffness. Because the proof masses cannot be supported by the rod, flexures 42 and 43 are used as nodal suspensions. The flexures used afford a torsionally stiff suspension. Unfortunately, the flexures are hard to fabricate, hard to balance and lead to a low Q-value of the vibrating proof masses.

Accordingly, the need exists for an improved angular reference apparatus, fully described in the following.

SUMMARY OF THE INVENTION

According to the present invention, an angular rate sensor is provided comprising two inertia members with their longitudinal direction along the Y-axis attached at their extreme ends by an elastic element to a common support. The elastic element has high axial, radial and torsional stiffness enabling it to support the inertia members. Both inertia members are tightly mechanically coupled by virtue of being joined by the elastic element. One of the inertia members is electrostatically angularly vibrated in the XY-plane about its center of gravity causing both inertia members to rotate about their centers of gravity at their mechanical natural frequency. Because the inertia members are not supported at their vibrational nodal points, no vibrational energy is lost due to nodal supports. This results in a high Q-value. An electronic feedback signal ensures a constant vibration velocity amplitude with the help of an automatic gain control (AGC).

An input angular rate of the entire instrument along the Y-axis causes a fraction of the kinetic energy in the XY-plane to shift to the YZ-plane. An electrostatic pickoff measures the angular vibrations of the inertia members in the YZ-plane and drives an electrostatic torquer through a feedback loop restraining the vibrations in this plane. The amplitude of this torque, equal to the Coriolis moment, is directly proportional to the input angular rate.

Linear acceleration and vibration forces upon the inertia members will elastically deform the elastic element a small amount, thereby moving the inertia members' centers of gravity without rotating the inertia members. The torquers and pickoffs are made insensitive to such linear movements of the centers of gravity due to linear vibrations of the gyro by means of cross-coupled pickoffs and torquers, which are fully described below. External linear vibrations normally occur within the frequency band between DC and 2 kHz. In order to minimize unwanted excitation from external sources, the vibrating element and inertia members are configured such that their linear mechanical resonance is higher than 2 kHz in all directions.

The torquers and pickoffs, according to this invention, are sensitive to angular vibrations of the inertia members and are insensitive to linear vibrations of the inertia members. No nodal suspension is used, thereby making it possible, according to the present invention, to separate the suspension of the inertia members from the nodal points of the inertia members. In addition, the electrostatic torquers and pickoffs can be located in one plane, simplifying the fabrication of the instrument. A regular geometric cross-section of the elastic element is used contrary to prior art teaching where a circular cross-section is described. This makes it possible to manufacture the instrument using micromachining of single crystal materials.

Full details of the present invention are set forth in the following description of the preferred embodiments and are illustrated in the accompanying drawings.

DESCRIPTION OF FIGURES

In the Drawings:

FIG. 4 is a side view of the instrument according to the present invention showing the beams, mounting plate with electrodes, proof masses and electrodes.

FIG. 5a shows a cross-section through section B—B of FIG. 4.

FIG. 5b shows a cross-section through section C—C of FIG. 4.

FIG. 11a is side view of an alternate embodiment of the inertia members.

FIG. 11b is a plan view of the inertia members of the alternate embodiment.

FIG. 11c shows a cross-section of the alternate inertia members through section D—D of FIG. 11a.

FIG. 11d shows a cross-section of the alternate inertia members through section E—E of FIG. 11a.

DETAILED DESCRIPTION OF PREFERRED EMBODIMENT

Figure 1:
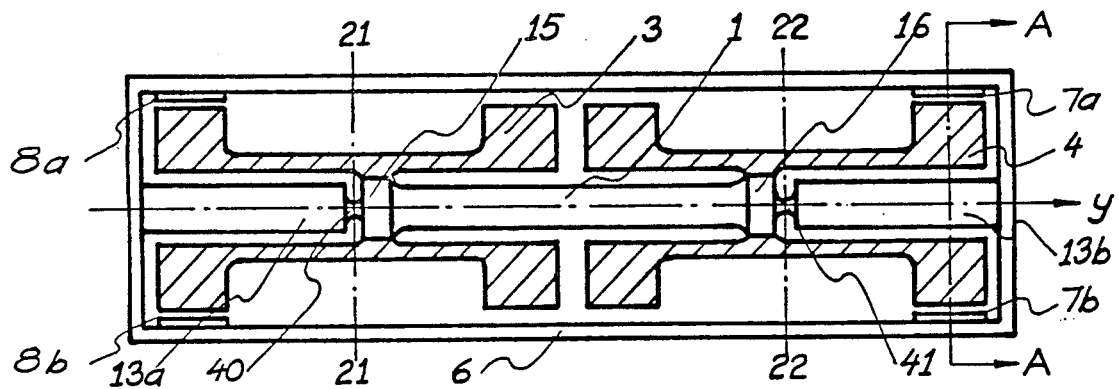
FIG. 1 shows a side view of prior art vibratory gyroscope according to U.S. Pat. No. 3,924,474.
Figure 2:
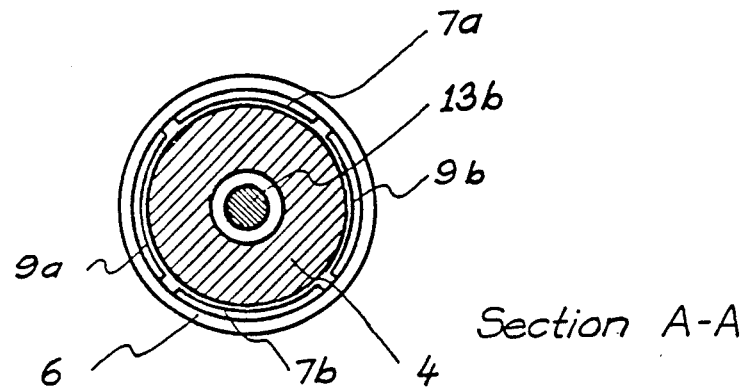
FIG. 2 shows cross-section through section A—A of FIG. 1.
Figure 3:
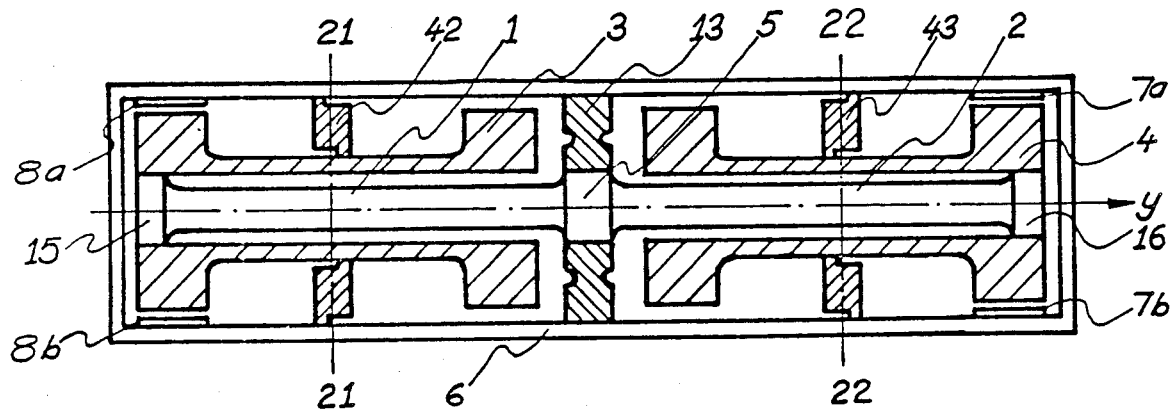
FIG. 3 shows a side view of prior art vibratory gyroscope according to U.S. Pat. No. 4,019,391.

In the preferred embodiment, the elastic element has two elastic beams, and the inertia members comprise proof masses. With reference to FIG. 4, two beams 1, 2 are attached to a housing 6 with support 5. Each proof mass is formed of two parts 3a, 3b and 4a, 4b which attach to the beam ends 15, 16. The proof masses are formed to allow angular vibration of the beams in the XY- and YZ-planes. Pickoff and driver electrodes are attached to a mounting plate 14 which is attached to housing 6. The bottom of each proof mass is rendered conductive and forms the electrodes 11a, 11b which is biased with a constant voltage source in order to linearize the electrostatic pickoffs and drivers. Motor electrodes are used to excite angular vibrations in the XY-plane, and torquer electrodes are used to restrain angular vibrations in the YZ-plane which will be described in more detail. FIG. 5a shows a cross-section of section B—B of FIG. 4. FIG. 5b shows a cross-section through section C—C of FIG. 4.

Figure 6A:
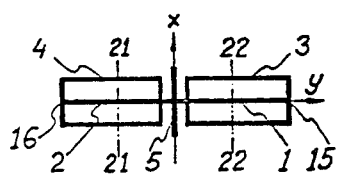
FIGS. 6a, 6b and 6c show schematic top views of how the beams and proof masses vibrate in the absence of an input angular rate. The motion is greatly exaggerated for clarity.
Figure 6B:
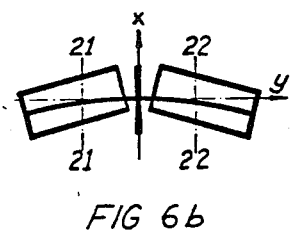
Figure 6C:
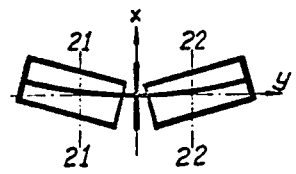

FIG. 6a shows a simplified view of the beams, proof masses and the proof masses' centers of gravity. With reference to FIG. 6b and FIG. 6c, the proof masses' centers of gravity are located at the intersection of the Y-axis and lines 21—21 and 22—22. The proof masses are longitudinally balanced such that their centers of gravity do not move when the proof masses are angularly vibrated. The nodal points of the proof masses are therefore located at the respective centers of gravity. The motion in FIG. 6b and FIG. 6c is greatly exaggerated for clarity.

Figure 7:
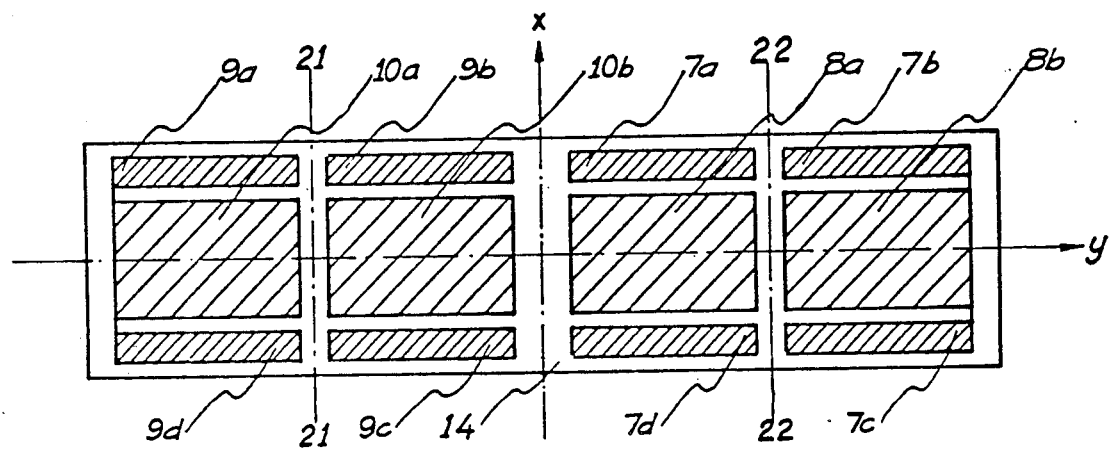
FIG. 7 is a top view of the mounting plate wit motor and torquer electrodes.

FIG. 7 is a top view of the mounting plate 14 with motor and torquer electrodes. The four motor drive electrodes 7a, 7b, 7c, 7d are identical in geometry to the four motor pickoff electrodes 9a, 9b, 9c, 9d. The two torquer drive electrodes 8a, 8b are identical in geometry to the two torquer pickoff electrodes 10a, 10b. Cross-coupled driver electrodes located symmetrically about one of the proof masses is necessary to angularly vibrate the proof masses, since no nodal suspension is used.

Figure 8:
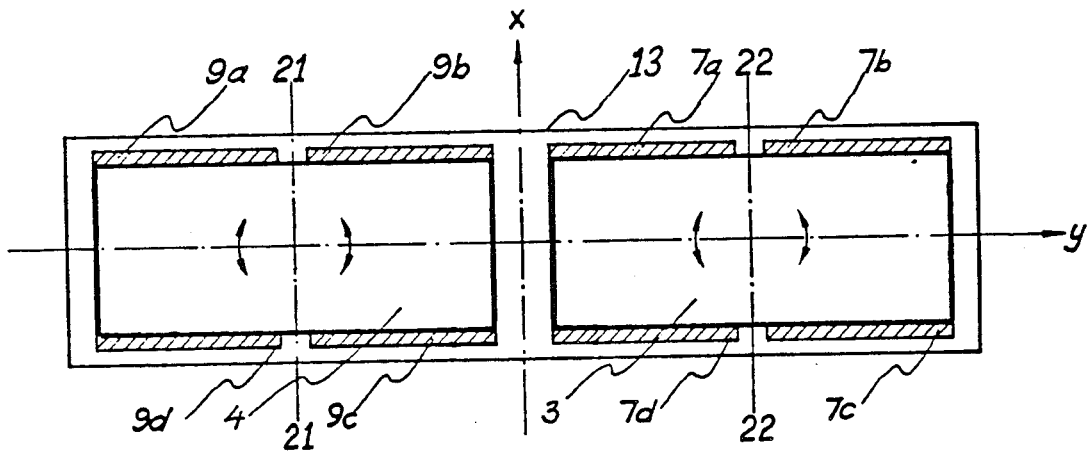
FIG. 8 is a top view of the beams, mounting plate with electrodes and proof masses, with the top half of each proof mass removed for clarity.

FIG. 8 is a top view of the mounting plate showing how the motor electrodes extend slightly beyond the edges of the proof masses 3b, 4b in order to make these electrodes sensitive to angular motions of the proof masses in the XY-plane. The beams 1, 2 are joined to a common support 5, which is fastened to the housing 6 in area 13.

Figure 9:
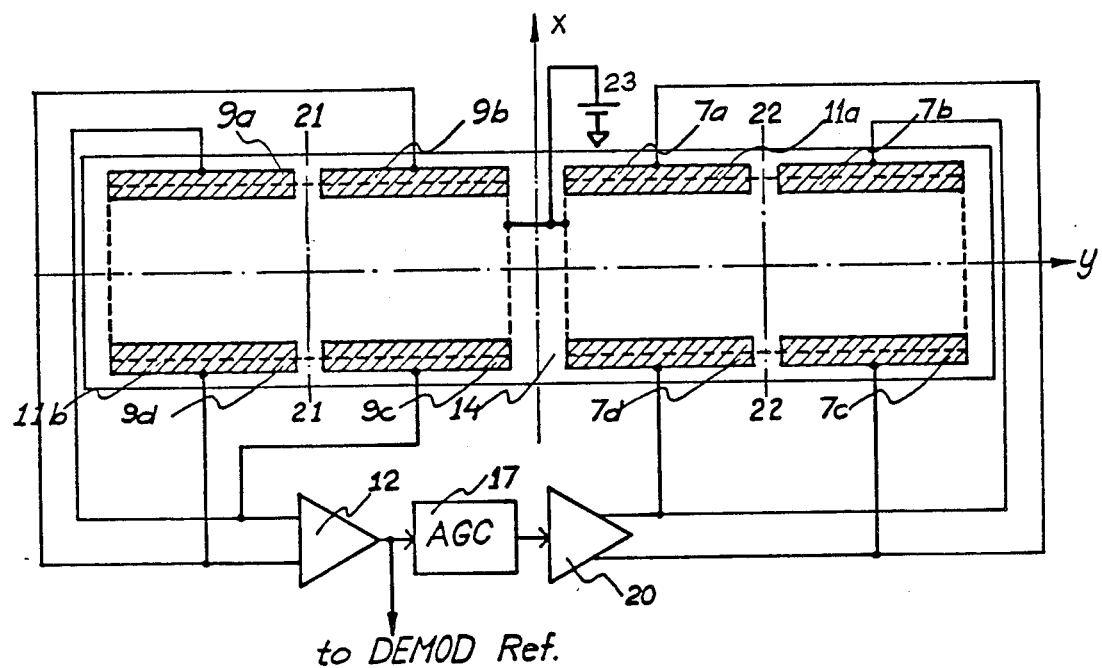
FIG. 9 shows a schematic over the motor pickoff and driver electrodes including the motor electronics.

With reference to FIG. 9, diametrically opposed motor pickoff electrodes are cross-coupled into pairs. For example, electrodes 9a and 9c form one pair, while electrodes 9b and 9d form the second. Electrodes 8 and 10 are not shown to improve clarity. Angular vibration of proof mass 4a, 4b in the XY-plane over the motor pickoff electrodes causes the capacitance difference between the proof mass electrode 11b and the electrode pairs to change. The current resulting from the changing capacitance difference is a measure of the angular velocity of the vibrations in the XY-plane. A linear vibration of a proof mass also causes a change in the capacitance, but since the capacitance difference does not change, no current results. The sensor is therefore insensitive to linear vibrations.

The gap between the proof masses and electrodes remains constant when the proof masses are angularly excited in the XY-plane. The cross-coupled four motor pickoff electrodes 9a, 9b, 9c, 9d develop a push-pull current, with the help of a constant bias voltage 23, that is converted to a voltage output in transconductance amplifier 12. This voltage is proportional to the proof masses' angular velocity in the XY-plane. The velocity in the XY-plane is kept constant by an automatic gain control circuit (AGC) 17, since the sensitivity of the instrument is directly proportional to the angular velocity. The AGC output drives the motor drive electrodes 7 via push-pull amplifier 20. A voltage applied between drive electrode pair 7a, 7c and drive electrode pair 7b, 7d results in a torque acting on the proof mass electrode 11a in the XY-plane. The resulting torque on proof mass 3 is directly proportional to the applied differential voltage with the help of the constant bias voltage 23. This capability is used to excite angular vibrations of proof mass 3 in the XY-plane. Because of the intrinsic tight mechanical coupling, proof mass 4 is also excited in this plane.

Figure 10:
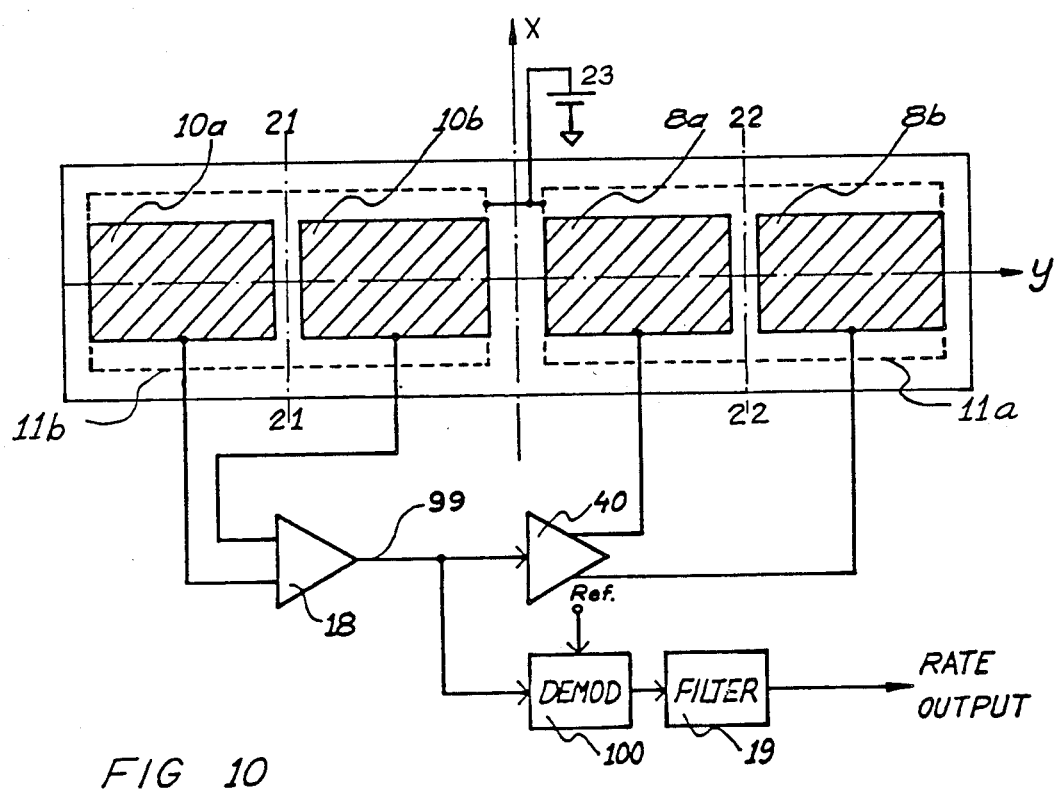
FIG. 10 shows the torquer pickoff and driver electrodes and torquer electronics schematics with output electronics.

With reference to FIG. 10, the torquer pickoff electrodes 10a and 10b and the torquer driver electrodes 8a and 8b operate in a differential or push-pull fashion. Electrodes 7 and 9 are not shown in order to improve clarity. An input angular rate about the Y-axis causes a fraction of the kinetic energy in the XY-plane to shift the YZ-plane, resulting in angular vibration in the YZ-plane. Angular vibration of proof mass 4 in the YZ-plane changes the gap between the proof mass electrode 11b and the torquer pickoff electrodes, causing a change in capacitance. This differential or push-pull current is converted into a voltage in transconductance amplifier 18, whose output voltage 99 is proportional to the angular velocity in the YZ-plane. A linear vibration of a proof mass also causes a change in the capacitance, but since the capacitance difference does not change, no current results. The sensor is therefore insensitive to linear vibrations.

Angular vibrations of proof mass 3 are restrained in the YZ-plane by feeding voltage 99 to the torquer electrodes 8a, 8b via push-pull amplifier 40. Because of the intrinsic tight mechanical coupling, the motion of the other proof mass 4 is also restrained in this plane. The amount of torque developed by the electrostatic torquer which eliminates the vibration in the YZ-plane is equal to the Coriolis moment developed by the input angular rate about the Y-axis.

Voltage 99 is demodulated in demodulator 100. The output voltage from the demodulator represents the angular rate input of the gyro in the form of a full-wave rectified output. This is filtered with, for instance, a third-order Cauer filter 19, to remove most of the ripple which occurs at twice the angular resonant frequency.

Since the proof mass movement is electrically restrained, a conventional viscous gas fill is unnecessary. Instead the sensor is operated in an evacuated environment. The inventor has have found the following: that only very small torques are necessary in order to drive the proof masses because of the high Q-value resulting from the absence of damping gas and nodal suspensions; and that most error sources due to, for instance, a natural frequency difference between angular vibrations in the XY-plane and YZ-plane, nonlinear spring rate of the elastic beams and damping that differs in different vibration planes can be tolerated by themselves or in combinations without causing undue angular rate bias errors provided that the vibrations of the proof masses are restricted to the XY-plane.

Beams made from a monocrystalline material, such as quartz or silicon, have high strength and a high Q-value due to low intrinsic damping. The low damping reduces the motor drive requirement. The ends of the inertia members are attached to the beam ends such that the entire beam length is evenly flexurally stressed with the inertia members vibrate about their centers of gravity. This causes the least energy loss in the supporting elastic beams which results in a high Q-value. Contrary to prior art teachings, the inventor found that strict rotational symmetry about the input axis is not necessary in part due to the feedback loop that keeps the proof mass vibrations in the XY-plane. Instead, the proof masses and the beams can have a rectangular, polygon shaped, or other regular geometric shaped cross-section simplifying fabrication. The natural angular vibration frequency in a plane is proportional to the radical of the ratio between the inertia and spring rate in that plane. The natural angular vibration frequencies in the XY-plane and YZ-plane will be equal if the ratio between the inertia and spring rate in one plane is equal to the ratio between the inertia and spring rate in the second plane. Rectangular proof masses 3 and 4 have different inertias in the XY-plane and YZ-plane. Because elastic beams 1 and 2 must have different spring rates in the XY-plane and YZ-plane, the dimensions of the elastic beams will be different in the X and Y directions. In other words, the inertia members have resonant frequencies in the first and second planes which may be designated as $f_1$ and $f_2$, respectively—with $f_1$ being proportional to the radical of the ratio between the inertia and the spring rate in the first plane, and $f_2$ being proportional to the radical of the ratio between the inertia and the spring rate in the second plane. Algebraically, the following equations result:

$$f_1 \ \alpha \ \sqrt{inertia_1/spring\ rate_2}$$

$$f_2 \ \alpha \ \sqrt{inertia_2/spring\ rate_2}.$$

Consequently, the elastic beams can be so dimensioned that the respective spring rates are proportional to the respective inertias, thereby causing $f_1$ to be substantially identical to $f_2$.

FIGS. 11a, 11b, 11c and 11d show an alternate embodiment of the instant invention where the inertial members 111a, 111b and 112a, 112b are integrated respectively, with elastic beam element extensions 111, 112 to corresponding bodies 113 and 114 such that no discrete proof masses are needed. The elastic elements are joined to a common mounting support 51. As shown, elastic element 111 has extensions (or arms) 111a and 111b, while elastic element 112 has extensions (or arms) 112a and 112b from respective main body portions 113 and 114.

Micromachining is a suitable fabrication process based on a photolithographic process, described in detail for quartz in T. Ueda et al., "Quartz Crystal Micromechanical Devices", *IEEE Transducers* 1985 *Technical Digest*, International Conference on Solid State Sensors and Actuators, pp. 113–116 and for silicon in J. Angell et al, "Silicon Micromchenical Devices", *Scientific American*, April 1983, pp. 44–55. Various regular geometric shaped beam cross-sections can be obtained from micromachining.

While the present invention has been described in preferred embodiments, it will be obvious to those skilled in the art that various modifications may be made without departing from the spirit of the invention which is intended to be limited solely by the appended claims:

What is claimed is:

1. An angular rate sensor comprising:
   (a) an elastic element having high axial, radial and torsional stiffness including:
      (i) two elastic beams; and
      (ii) a common support joining the two elastic beams;
   (b) two inertia members balanced such that their respective centers of gravity would remain static when the inertia members are angularly vibrated;
   (c) means for angularly vibrating the inertia members in a first plane such that the inertia members have respective angular vibrational nodal points coinciding with their corresponding centers of gravity;
   wherein each of the inertia members is respectively tightly coupled to a free end of corresponding one of the elastic beams such that the inertia members are not supported at their respective vibrational nodal points so that when at least one of the inertia members is angularly vibrated about its center of gravity, no substantial vibrational energy is lost since the inertial members are not supported at their respective vibrational nodal points and a high Q-value is thereby generated.

2. The angular rate sensor of claim 1, wherein, due to the tight coupling of the elastic beams to the corresponding interial members, the means for angularly vibrating the inertia members further causes the elastic beams to be evenly stressed along their respective entire lengths.

3. The angular rate sensor of claim 1, further comprising:
   means for restraining angular vibrations of the inertia members in a second plane.

4. The angular rate sensor of claim 1, further comprising:
   means for sensing angular vibrations of the inertia members in first and second planes.

5. The angular rate sensor of claim 1, further comprising:
   means for restraining angular vibrations of the inertia members in a second plane;

means for sensing angular vibrations of the inertia members in the first and second planes;

wherein the vibrating, restraining and sensing means are located coplanarly.

6. The angular rate sensor of claim 1, wherein the elastic elements are made of a monocrystalline material.

7. The angular rate sensor of claim 5, wherein the inertia members have resonant frequencies $f_1$ and $f_2$ in the first and second planes where $$f_1 \alpha \sqrt{inertia_1/spring\ rate_1} \quad \text{and}$$

$$f_2 \alpha \sqrt{inertia_2/spring\ rate_2}$$

wherein said elastic beams are dimensioned such that the respective spring ranges are proportional to the respective inertias of the inertia members, thereby causing $f_1$ to be substantially identical to $f_2$.

8. The angular rate sensor of claim 1, wherein each of the inertia members comprises two rectangular cross-sectional members.

9. The angular rate sensor of claim 1, wherein the elastic beams and common support of the elastic elements are cross-sectionally rectangular shaped.

10. The angular rate sensor of claim 5, wherein the vibrating, restraining and sensing means comprise electrostatic elements.

11. The angular rate sensor of claim 5, wherein the vibrating means, the restraining means and the sensing means respectively comprise cross-coupled electrostatic elements; and wherein the vibrating, restraining and sensing means are insensitive to linear vibrations of the inertia members by virtue of being cross-coupled.

12. An angular rate sensor comprising:

two inertia members each having an elastic element and two arms connected to a free end of the elastic element and integrally extending in parallel from a body, the inertia members having corresponding centers of gravity;

means for angularly vibrating the inertial members in a first plane such that the inertial members have respective angular vibrational nodal points coinciding with their respective centers of gravity;

a support tightly coupling the respective elastic elements of the inertia members so that the inertia members are not supported at their respective vibrational nodal points and that vibrations received by one of the inertia members is transmitted to the other inertia member;

wherein, when at least one of the inertia members is angularly stressed, no substantially vibrational energy is lost and a high Q-value is thereby generated.

13. The angular rate sensor of claim 12, further comprising:

means for restraining angular vibrations of the inertia members in a second plane;

means for sensing angular vibrations of the inertia members in the first and second planes;

wherein the vibrating, restraining and sensing means are located coplanarly.

14. The angular rate sensor of claim 13, wherein the inertia members have resonant frequencies $f_1$ and $f_2$ in the first and second planes where $$f_1 \alpha \sqrt{inertia_1/spring\ rate_1} \quad \text{and}$$

$$f_2 \alpha \sqrt{inertia_2/spring\ rate_2}$$

wherein said elastic elements are elastic beams dimensioned such that the respective spring rates are proportional to the respective inertias of the inertia members, thereby causing $f_1$ to be substantially identical to $f_2$.

15. The angular rate sensor of claim 13, wherein the vibrating, restraining and sensing means comprise electrostatic elements.

16. The angular rate sensor of claim 13, wherein the vibrating means, the restraining means and the sensing means respectively comprise cross-coupled electrostatic elements; and wherein the vibrating, restraining and sensing means are insensitive to linear vibrations of the inertia members by virtue of being cross-coupled.

17. The angular rate sensor of claim 12, wherein the inertia members are made of a monocrystalline material.

* * * * *